(12) United States Patent
Anton

(10) Patent No.: US 6,752,302 B2
(45) Date of Patent: Jun. 22, 2004

(54) MOTOR VEHICLE INTEGRATED CARRIER RACK SYSTEM

(76) Inventor: Mark A. Anton, 245 Emerald Bay, Laguna Beach, CA (US) 92651

( * ) Notice: Subject to any disclaimer, the term of this patent is extended or adjusted under 35 U.S.C. 154(b) by 126 days.

(21) Appl. No.: 10/014,878

(22) Filed: Dec. 10, 2001

(65) Prior Publication Data

US 2002/0088832 A1 Jul. 11, 2002

Related U.S. Application Data

(60) Provisional application No. 60/254,705, filed on Dec. 11, 2000.

(51) Int. Cl.$^7$ ............................. B60R 9/02; B60R 9/06
(52) U.S. Cl. ..................... 224/517; 224/557; 280/762; 280/769
(58) Field of Search ................ 224/515, 517, 224/518, 544, 557, 42.12, 42.21; 280/762, 767, 769

(56) References Cited

U.S. PATENT DOCUMENTS

| | | |
|---|---|---|
| 2,566,303 A | 9/1951 | Allmond |
| 2,570,802 A | 10/1951 | Hattenburg |
| 2,678,150 A | 5/1954 | Lund |
| 2,712,470 A | 7/1955 | Cardini |
| 2,729,499 A * | 1/1956 | Murnat ..................... 224/557 |
| 3,049,273 A | 8/1962 | Crane |
| 3,338,485 A | 8/1967 | Van Leer, Jr. et al. |
| 3,371,832 A | 3/1968 | Sekino et al. |
| 3,437,248 A | 4/1969 | Allen |
| 3,727,813 A | 4/1973 | Eby |
| 3,794,227 A | 2/1974 | Stearns |
| 3,838,802 A | 10/1974 | Grycel III |
| 4,042,157 A * | 8/1977 | Weiler ..................... 224/42.21 |
| 4,073,395 A | 2/1978 | Clement |
| 4,078,708 A | 3/1978 | Mayer |
| 4,298,151 A | 11/1981 | O'Connor |
| 4,299,341 A | 11/1981 | Copeland et al. |
| 4,444,427 A | 4/1984 | Martin |
| 4,531,774 A | 7/1985 | Whatley |
| 4,771,926 A | 9/1988 | Anderson et al. |

(List continued on next page.)

FOREIGN PATENT DOCUMENTS

| | | |
|---|---|---|
| DE | 41 31 854 A1 | 4/1993 |
| DE | 44 32 493 A1 | 3/1996 |
| DE | 195 21 886 A1 | 6/1996 |
| DE | 197 15 527 A1 | 11/1997 |
| DE | 42 41 008 C2 | 1/1998 |
| EP | 1 083 093 A1 | 3/2001 |
| EP | 1 095 820 A1 | 5/2001 |

OTHER PUBLICATIONS

Rhode Gear, Revolution Strada; Website: http://www.world-widesports.com/picpages/bikes /carracks/carracksrhodegearrevolutionstrada.shtml, 1–page (May–26, 2001).

*Primary Examiner*—Gary E. Elkins
(74) *Attorney, Agent, or Firm*—Orrick, Herrington & Sutcliffe LLP

(57) ABSTRACT

An integrated carrier rack system for motor vehicles. Generally, the system includes a receiving unit, having rear and forward ends, integrated into a rear wall, such as a rear section of a trunk lid, a tailgate of a pickup truck, or a rear door of a van, a side wall, such as a side of a truck bed, a side door, or a side of a trunk lid, or a front wall, such as a front of a bus, a front of a truck, or a front of a motor home. The receiving unit may be positioned such that the rear end is directed toward the outside of the vehicle and forms an engaging structure in the rear, side, or front wall. The system further includes an immobilizing system attached to the receiving unit, a carrier bar engaged to the receiving unit, and various attachment units. The integrated carrier rack system is user friendly and may be applied to any motor vehicle to carry an assortment of items.

22 Claims, 10 Drawing Sheets

U.S. PATENT DOCUMENTS

| | | |
|---|---|---|
| 4,976,386 A | 12/1990 | Geiger |
| 5,096,102 A * | 3/1992 | Tolson .................. 224/517 |
| 5,137,192 A | 8/1992 | Sheridan et al. |
| 5,255,951 A | 10/1993 | Moore, III |
| 5,257,728 A | 11/1993 | Gibson |
| 5,314,101 A * | 5/1994 | White .................. 224/515 |
| 5,350,095 A | 9/1994 | Stevens |
| 5,372,287 A | 12/1994 | Deguevara |
| 5,413,260 A * | 5/1995 | McFarland .............. 224/544 |
| 5,439,151 A * | 8/1995 | Clayton ................ 280/769 |
| 5,570,825 A | 11/1996 | Cona |
| 5,593,076 A | 1/1997 | Biondo |
| 5,690,260 A | 11/1997 | Aikins et al. |
| 5,699,985 A | 12/1997 | Vogel |

* cited by examiner

← FRONT OF VEHICLE　　BACK OF VEHICLE →

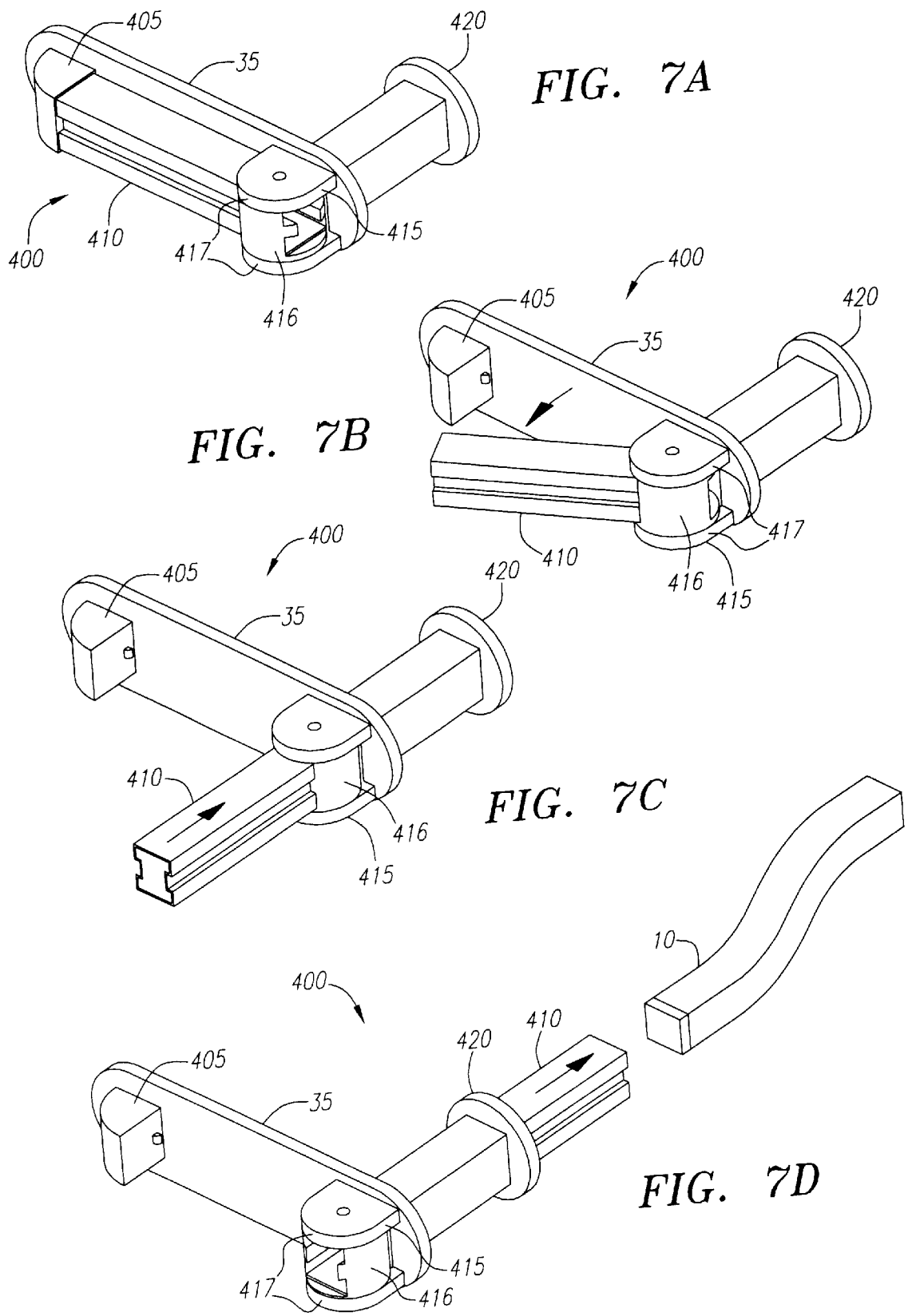

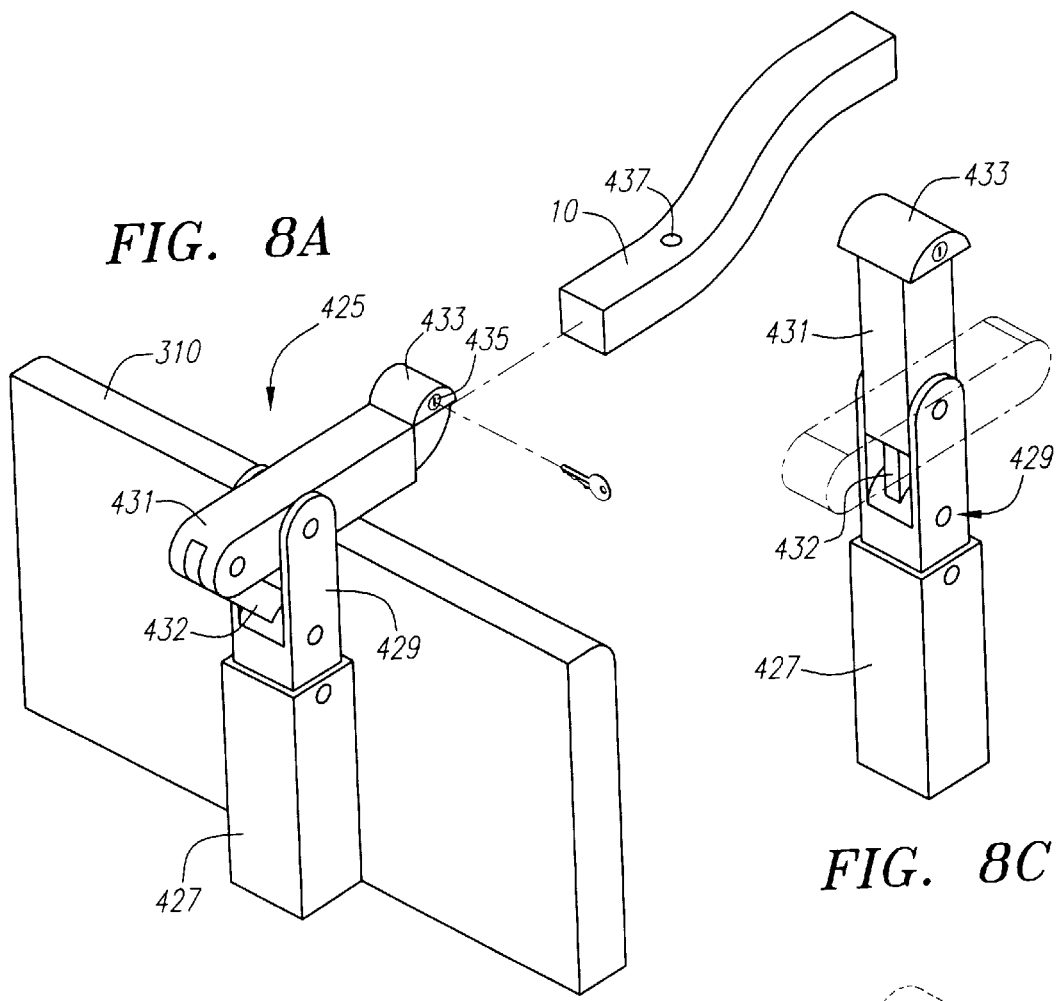
FIG. 8A
FIG. 8C
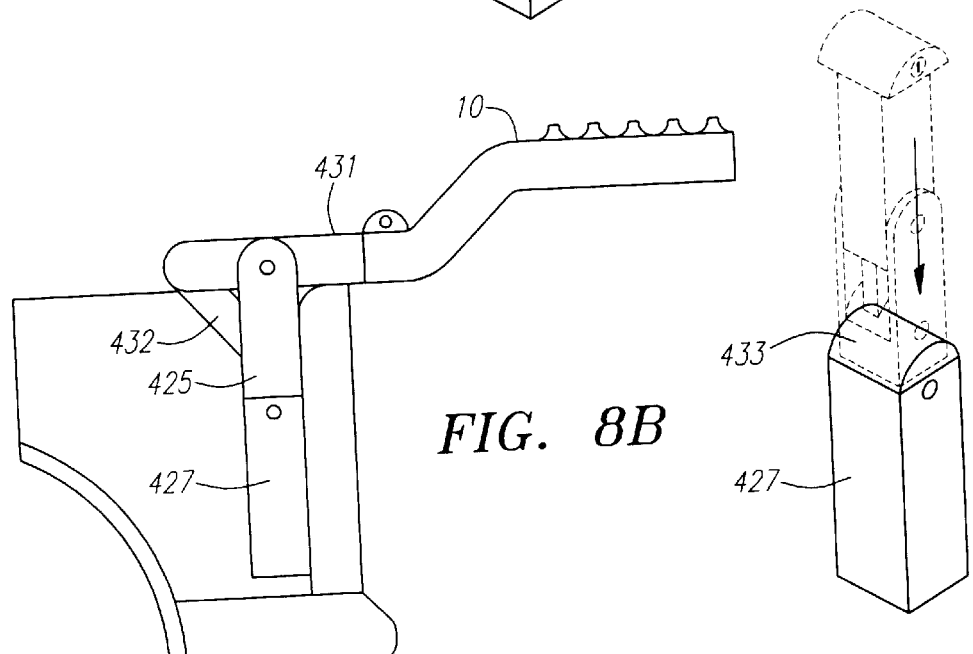
FIG. 8B
FIG. 8D

MOTOR VEHICLE INTEGRATED CARRIER RACK SYSTEM

This application claims the benefit of U.S. Provisional Application Serial No. 60/254,705, filed Dec. 11, 2000.

FIELD OF THE INVENTION

The present invention relates generally to carrier racks for motor vehicles, and more particularly to carrier rack systems that are integrated into a motor vehicle—carrier rack systems that are designed to carry items such as bicycles, skis, snowboards, surfboards, wave boards, scooters, and luggage.

BACKGROUND OF THE INVENTION

Present carrier rack systems for motor vehicles, such as cars, trucks, vans, minivans, sports utility vehicles (SUV's), and motor homes, generally involve a system of multiple straps attached onto the vehicle, a system attached to a universal hitch, a system attached to a roof, or a system attached to a bumper. These systems are cumbersome, heavy, and difficult to store at home or in the vehicle when the systems are not in use. Additionally, these systems may not be adaptable to all types of vehicles, and when some of these systems are attached, they often make it difficult to access the trunk or doors. These systems are susceptible to theft and may scratch and damage the vehicle when attached and used.

In the case of systems involving multiple straps, these systems are complicated to attach onto the vehicle and may loosen with use over time. In the case of systems attached to the roof, these systems create wind resistance when the car is moving and are difficult to access. For carrier systems that are attached to bumpers, these systems damage the sensitive bumper mechanism and have limited supportability. For trailer hitch systems, the systems are heavy and difficult to attach, detach, and store.

Accordingly, an improved carrier rack system for motor vehicles would be desirable.

SUMMARY OF INVENTION

The present invention is directed to carrier rack systems for motor vehicles, and more particularly to carrier rack systems that are integrated into motor vehicles at the time of vehicle manufacture or after production (retrofitted).

In accordance with one aspect of the present invention, a carrier rack system is integrated into a portion of a motor vehicle with a rear wall, such as a tailgate of a pickup truck, a trunk lid of a car, a rear license plate wall, or a rear door of a minivan or sports utility vehicle, having an inside and outside. The system generally includes a receiving unit, having rear and forward ends, integrated into the rear wall, an immobilizing system attached to the receiving unit, and/or a carrier bar attached to the receiving unit. The receiving unit may be positioned such that the rear end is directed toward the back of the vehicle and forms an engaging structure in the rear wall that can be aesthetically hidden from view with a cover or cap.

The carrier bar can generally be universal, meaning it can be attached to any vehicle with a receiving unit and can have any attachments placed on the carrier bar to carry a variety of items. The carrier bar is generally lightweight, easily stored in the vehicle when not in use, and easily attachable to the receiving unit when use is desired. When in use, the carrier bar will not damage the paint on the vehicle. Also, supportability is improved with the carrier because it can be positioned at an optimum level on the vehicle, providing ample distance from the ground when an item is attached to the carrier bar and providing less stress to a person's back when the person is loading the item onto the carrier bar. The invention is advantageous in that it provides a lightweight and easy to use carrier rack system that can be integrated into motor vehicles. The invention is further advantageous in that it would not damage or scratch the vehicle.

In accordance with another aspect of the invention, the receiving unit described above is integrated into a portion of a motor vehicle having a side wall, such as a side of a truck bed, a side door, or a side of a trunk lid.

In accordance with another aspect of the invention, the receiving unit described above is integrated into a portion of a motor vehicle having a front end, such as a front end of a bus, motor home, van, truck, SUV, or minivan.

Other advantages and features of the present invention will become apparent from consideration of the following description taken in conjunction with the accompanying drawings.

BRIEF DESCRIPTION OF THE DRAWINGS

FIGS. 7A–7D are plan view of another exemplary receiving unit in accordance with the present invention.

FIGS. 8A–8D are diagrams of an alternative exemplary receiving unit integrated into the tailgate of a pickup truck in accordance with the present invention.

DETAILED DESCRIPTION

Figure 1:
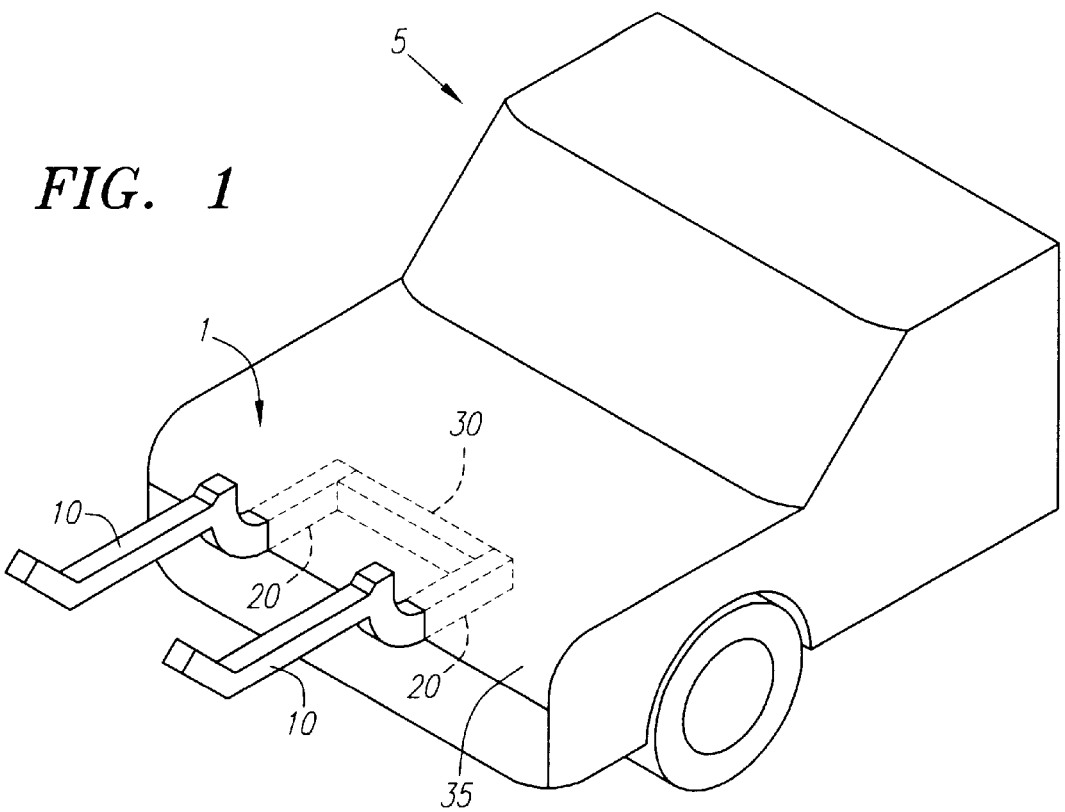
FIG. 1 is a diagram of an exemplary carrier rack system integrated onto a trunk lid of a vehicle in accordance with the present invention.

Turning now to the drawings, FIG. 1 shows a carrier rack system 1 in accordance with the present invention. The carrier rack system 1 may be integrated into the rear section of a motor vehicle 5, i.e., the system 1 may become part of the structure of the motor vehicle 5, which may involve welding and/or mounting the system into and/or onto the motor vehicle 5. The system 1 generally includes at least one receiving unit 20 integrated into a rear wall of a vehicle, such as a trunk lid, a tailgate of a pickup truck, a rear door of a sports utility vehicle or minivan, or a rear license plate wall. The receiving unit 20 generally includes an engaging structure to which a carrier bar 10 may be attached. In FIG. 1, a pair of receiving units 20 are integrated into a trunk lid 35, having a rear section. The integration may involve creating a hole for each receiving unit 20 in the rear section of the trunk lid 35, spaced at a predetermined distance apart, which may be aesthetically hidden from view with color coordinated caps. Each receiving unit 20 may be a hollow bar composed of metal and/or plastic, having rear and forward ends, welded and/or mounted and positioned longitudinally along the inside of the trunk lid 35. The forward end is directed toward the front of the motor vehicle 5, while the rear end is directed toward the back, fitting into the hole and creating the engaging structure—in this example, a receiving aperture into which a carrier bar 10 may be inserted and locked in place within the rear wall and/or outside of the rear wall. If more than one receiving unit 20 is used, they may be positioned side-by-side as shown in FIG. 1 or stacked vertically.

The carrier bar 10 generally functions to carry a desired set of items and may carry an array of items such as bicycles, snow skis, surfboards, and luggage and may include a variety of attachments to better lock the carried items. This system 1, when installed, still allows for the trunk lid 35 to be opened when desired.

Figure 2:
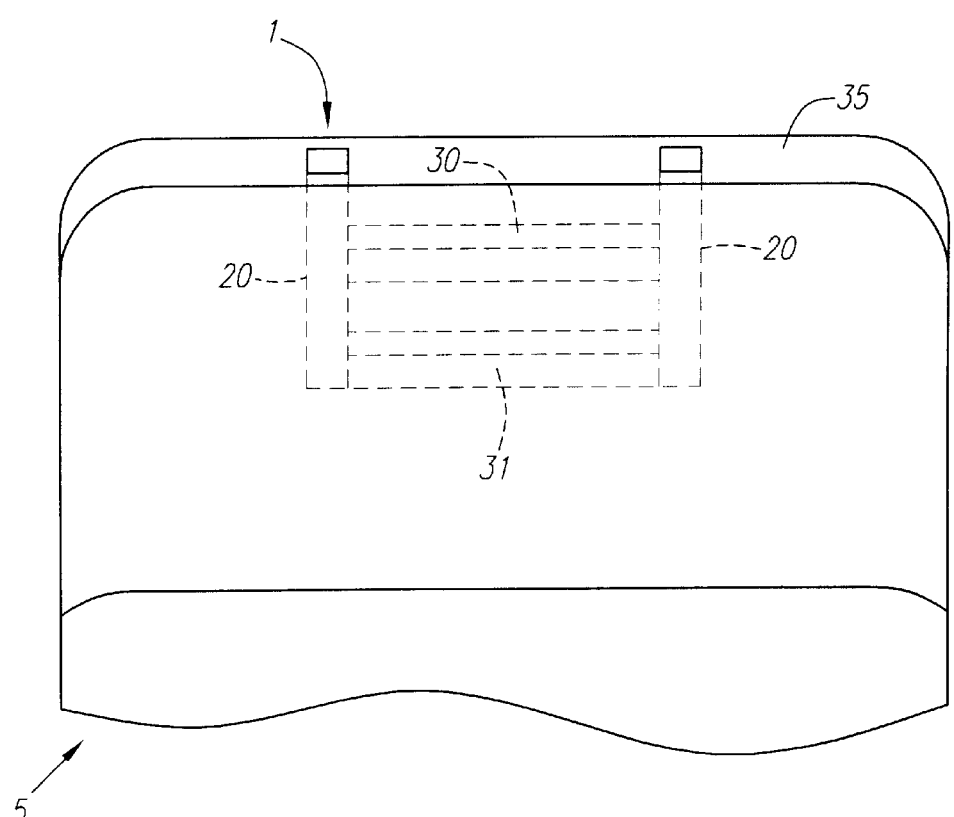
FIG. 2 is a diagram of an open trunk lid showing a receiving unit integrated into the trunk lid in accordance with the present invention.

Immobilizing the receiving units 20 and carrier bars 10 used in the carrier system 1 is critical. An immobilizing system is used and may include attaching one or more support bars 30 to the receiving units 20. Referring to FIG. 2, a view of the inside of an open trunk lid 35 is shown. A pair of receiving units 20 are integrated into the trunk lid as described above and shown in FIG. 1. A support bar 30 is integrated into the trunk lid 35, positioned laterally along the trunk lid 35, and attached to the receiving units 20 to distribute the weight of the items on the carrier bar 10 and to immobilize the carrier system 1 when in use. This can involve welding and/or mounting the bar 30 with bolts and/or screws to the inside of the trunk lid. An additional support bar is integrated into the trunk lid to serve as a secondary support bar 31. The secondary support bar 31 is also positioned laterally along the trunk lid 35 and attached to the receiving units 20 at the forward ends of the receiving units 20. Alternatively, a plurality of support bars 30 may be positioned longitudinally where each support bar 30 is attached to each receiving unit 20. In the case of a vehicle having a rear deck—a flat area behind back seats and in front of the trunk lid 35, the support bars may extend to the rear deck to provide additional support and immobilization. This may counteract any downward pressure of the system 1 caused by the weight of items on the carrier bars 10. The support bars may also be extended vertically and integrated into the chassis through the trunk floor. Another alternative immobilizing system may include integrating a plurality of support bars 30 that are attached to each receiving unit 20 and positioned in angles.

Figure 3:
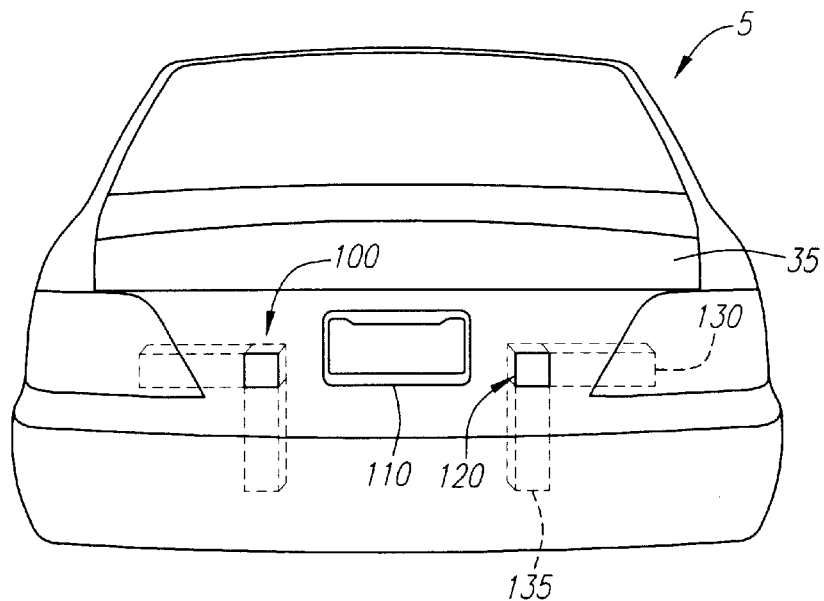
FIG. 3 is a diagram of an exemplary receiving unit integrated into the rear license plate wall in accordance with the present invention.

Turning to FIG. 3, another exemplary system 100 in accordance with the present invention is shown. A pair of receiving units 120 are integrated into a rear license plate wall 110 of a vehicle 5—the rear wall of the vehicle onto which the license place is attached—having an inside, an outside, and an area within the rear license plate wall 110. Generally, the wall 110 is located below a trunk lid 35 or rear door. A hole is created in the rear license plate wall for each receiving unit. Each receiving unit 120 includes a hollow bar having rear and forward ends positioned such that the forward end is directed toward the front of the vehicle and the rear end is directed toward the back of the vehicle, fitted into the hole, creating the engaging structure—a receiving aperture into which a carrier bar 10 may be inserted. The receiving units 120 may be located side-by-side in the rear license plate wall or stacked vertically. To immobilize the system 100, a plurality of support bars are integrated into the rear license plate wall 110, attached to each receiving unit 120, and positioned laterally 130, vertically 135, longitudinally, and/or in angles. The integration process involves mounting and/or welding the bars in the area within the rear license plate wall 110, or in the alternative, the support bars may be welded and/or mounted proximately to the inside of the license plate wall and/or along the trunk floor. The support bars may also be extended vertically and integrated into the chassis through the trunk floor. This system 100, when installed and in use, allows for the trunk lid to be opened when desired.

Figure 4:
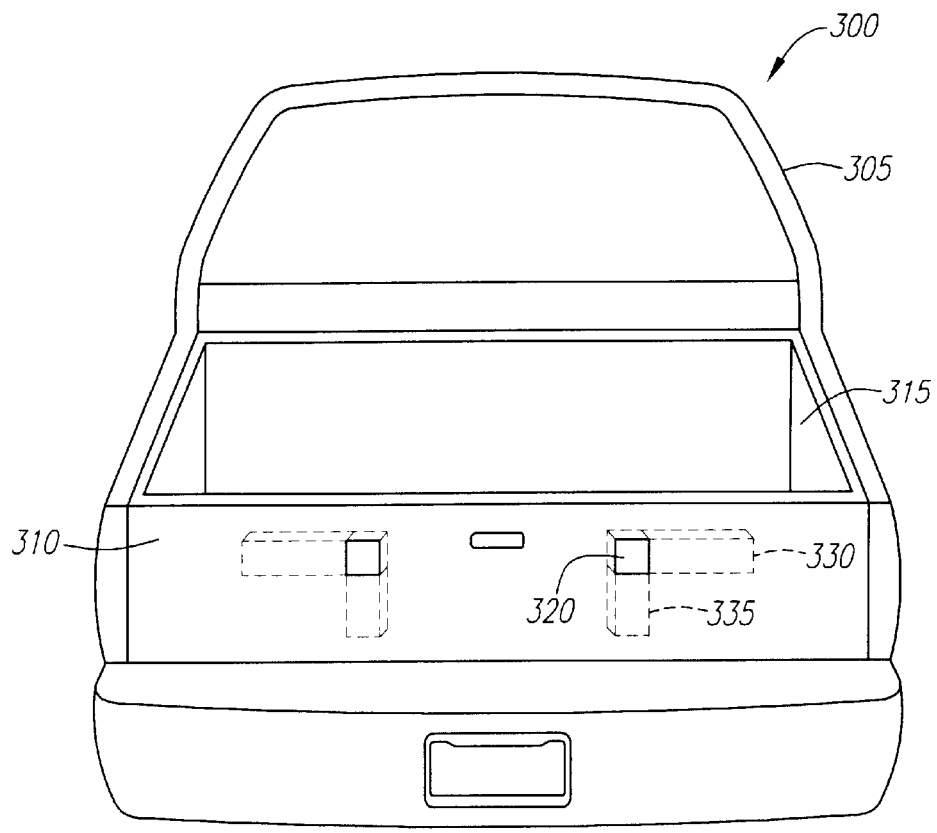
FIG. 4 is a diagram of an exemplary receiving unit integrated into the tailgate of a pickup truck in accordance with the present invention.

Turning to FIG. 4, in the case of a pickup truck 305 having a tailgate 310, having an inside, an outside, and an area within the tailgate, and a truck bed 315, another system 300 in accordance with the present invention is shown. A pair of receiving units 320 are integrated into the tailgate 310. A hole is created in the tailgate for each receiving unit. Each receiving unit includes a hollow bar having rear and forward ends positioned such that the forward end is directed toward the front of the vehicle and the rear end is directed toward the back of the vehicle, fitted into the hole, creating the engaging structure—a receiving aperture to which a carrier bar 10 may be inserted. The receiving units 120 may be located side-by-side in the tailgate or stacked vertically.

To immobilize the system 300, support bars are integrated into the tailgate and positioned laterally 330, vertically 335, longitudinally, and/or in angles. The integration process may involve mounting and/or welding the bar in the area within the tailgate, or in the alternative, the support bars may also be welded and/or mounted proximately to the inside of the tailgate 310 and/or along the truck bed 315. The support bars may also be extended vertically and integrated into the chassis through the truck bed 315.

Figure 5:
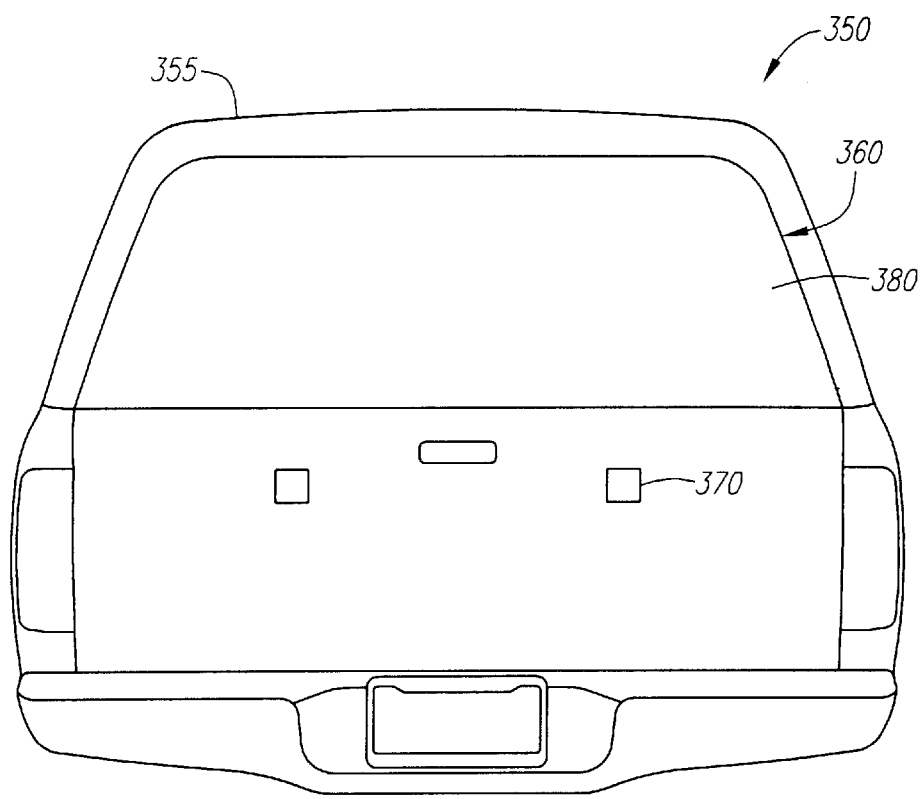
FIG. 5 is a diagram of an exemplary receiving unit integrated into the rear door of a sports utility vehicle in accordance with the present invention.

Turning to FIG. 5, in the case of a van, minivan, sports utility vehicle (SUV), or motor home, 355 having a rear door 360, having an inside, an outside, and an area within the rear door 360, another system 350 in accordance with the present invention is shown. A pair of receiving units 370 are integrated into the rear door 360. These can be integrated either below the window 380 or above the window 380. A hole is created in the rear door for each receiving unit. Each receiving unit 120 includes a hollow bar having rear and forward ends positioned such that the forward end is directed toward the front of the vehicle and the rear end is directed toward the back of the vehicle, fitted into the hole, creating the engaging structure—a receiving aperture to which a carrier bar 10 may be inserted. The receiving units 120 may be located side-by-side in the rear door or stacked vertically.

As with the other systems described above, support bars may also be included, attached to each receiving unit 120, and positioned laterally, vertically, longitudinally, and/or in angles. The integration process may involve mounting and/or welding the bars in the area within the rear door 360, or in the alternative, mounting and/or welding the support bars proximately to the inside of the rear door.

Figure 6:
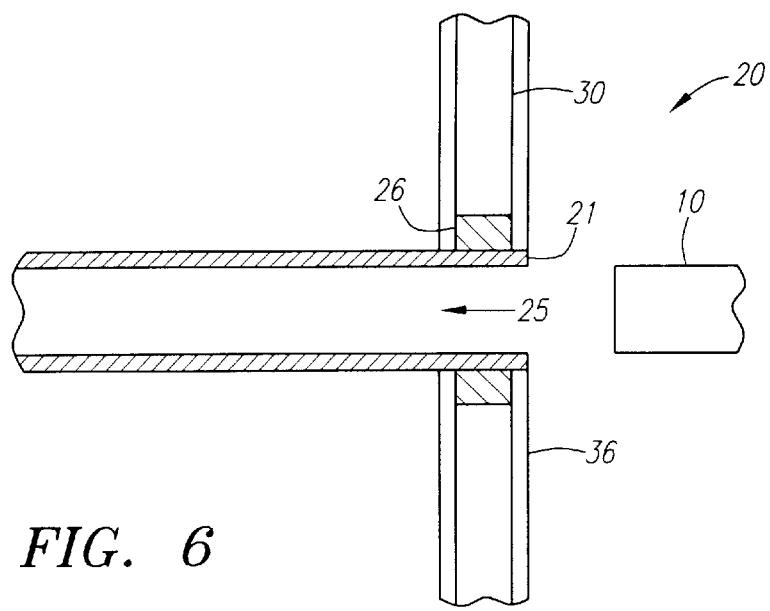
FIG. 6 is a plan view of an exemplary receiving unit in accordance with the present invention.

Alternative embodiments of the receiving unit in accordance with the present invention will now be described. The receiving unit is an element that forms an engaging structure—a structure onto which a carrier bar may be attached—in and/or on the motor vehicle. Turning to FIG. 6, a plan view of a receiving unit 20 integrated into a rear wall of a vehicle 36, in accordance with the present invention, is shown. A hole is created in the rear wall 36, and a hollow bar 21 having rear and forward ends is positioned such that the forward end is directed toward the front of the vehicle, and the rear end is fitted into the hole, creating the engaging structure—a receiving aperture 25—out of the back of the rear wall 36. The receiving unit 20 may include a support block 26, which may be made of plastic, metal, or rubber, to immobilize the hollow bar 21, positioned such that it surrounds the hollow bar 21 at the rear end, proximate to the receiving aperture 25. Support bars 30, integrated into the rear wall 36 and attached to the support block and/or the hollow bar, are used to immobilize the carrier system 1, as described above. A carrier bar 10 may be inserted into the receiving aperture 25 and locked into place.

Turning to FIG. 7(a), an alternative receiving unit 400 installed on a rear wall of a vehicle 35 in accordance with the present invention is shown. A hole is created on the rear wall 35 and a structure 420 having a channel is mounted in the inside of the rear wall 35, surrounding the hole and positioned such that the channel is aligned with the hole. A receptacle guide 416 having a channel and a first and second side, is placed in between two parallel thin plates 417, and each side is attached to a plate such that the receptacle guide is capable of pivoting on an axis perpendicular to the plates. The thin plates 417 are mounted to the inside of the rear wall 35, positioned perpendicular to the rear wall 35, surrounding the hole 35. A hollow receptacle 410 having rear and forward ends is inserted into the channel of the receptacle guide 416 and is capable of sliding along the channel 416. While the receiving unit 400 is not in use, the receptacle 410 can be stored along the inside of the rear wall 35 and held in place by a receptacle lock 405 mounted to the inside of the rear wall 35 and positioned such that the forward end of the receptacle 410 can be held by the receptacle lock 405 while the rear end of the receptacle 410 is held by the receptacle guide 416.

Turning to FIG. 7(b), to prepare the receiving unit 400 for use, the forward end of the receptacle 410 can be released from the receptacle lock 405 and pulled away from the inside of the rear wall 35 while the rear end remains inserted into the receptacle guide 416. Turning to FIG. 7(c), the receptacle 410 can be pivoted along the axis formed by the receptacle guide 416 and the thin plates 417 until the rear end of the receptacle 410 is aligned with the hole in the rear wall 35. Turning to FIG. 7(d), the receptacle 410 can then be slid through the receptacle guide 416, the hole in the rear wall 35, and through the channel of the structure 420 until the rear end of the receptacle 410 protrudes from the structure 420. This receptacle 410 functions as the engaging structure of the receiving unit 400 to which a carrier bar 10 may be inserted. Alternatively, the receptacle 410 may be a solid piece, and the carrier bar 10 may be hollow and fitted over the receptacle 410. Another alternative includes having the carrier bar telescopically integrated into the receptacle. This involves making a carrier bar, having rear and forward ends, telescopic in structure. The forward end is inserted into the receptacle 410, located toward the forward end of the receptacle 410, and locked into place. The carrier bar may be stored within the receptacle such that when the receptacle 410 is protruding from the structure 420, the carrier bar may be pulled out telescopically from the receptacle 410.

Turning to FIG. 8(a), an exemplary receiving unit in accordance with the present invention is shown integrated onto a tailgate 310, having an inside and outside and top and bottom, of a pickup truck. A storage unit 427 having rear and forward ends and an opening at the rear end, is mounted vertically toward the bottom and along the inside of the tailgate with the rear end positioned upward. A hollow pivoting bar 429 having rear and forward ends with the rear end forking into two parallel thin plates is inserted into the storage unit 427 with the forward end facing downward such that the pivoting bar 429 is capable of sliding in and out of the storage unit. The pivoting bar 429 may be slid out of the storage unit until the rear end extends just beyond the top of the tailgate. A receptacle 431, having rear and forward ends, a middle, and two sides, is attached to the pivoting bar 429 such that the middle of the receptacle is placed in between the parallel thin plates of the hinging bar 429 and each side is attached to a thin plate, forming an axis perpendicular to the thin plates that the receptacle 431 can pivot on. A bar 432, having rear and forward ends, extends from the beginning of the fork of the pivoting bar 429 at the rear end. The rear end is attached in between the thin plates forming an axis. The bar 432 is capable of sliding into the pivoting bar 429. The forward end of the bar 432 is attached to the forward end of the receptacle 431 forming a pivoting joint at the forward end of the receptacle 431. This bar 432 provides the vertical support of the receptacle 431. The rear end of the receptacle 431 is hollow, forming the engaging structure. The engaging structure includes a cover 433 attached to an edge of the engaging structure via a hinge.

When the receiving unit 425 is in use, the pivoting bar 429 is extended beyond the top of the tailgate 310. The receptacle 431 rests on the axis in between the thin plates of the pivoting bar 429 and is positioned perpendicularly to the pivoting bar 429 with the engaging structure extending beyond the back of the tailgate 310. The cover 433 opens, allowing a carrier bar 10 to be inserted into the receptacle 431 at the engaging structure. The cover 433 also includes a key lock, locking the carrier bar 10 in place at a hole 437 created in the carrier bar just behind the end that is inserted into the receptacle 431. This may prevent theft. FIG. 8(b) shows a side view of the receiving unit 425 with a carrier bar 10 inserted into the receptacle 431. The carrier bar 10 may also be fitted over the receptacle 431, or in the alternative, telescopically pulled out from the receptacle 431.

When the receiving unit 425 is no longer in use, the receptacle 431 may be pivoted upward until aligned with the storage unit 427 as shown in FIG. 8(c). Then, the receptacle 431 and the pivoting bar may be slid into the storage unit 427 as shown in FIG. 8(d).

Figure 9:
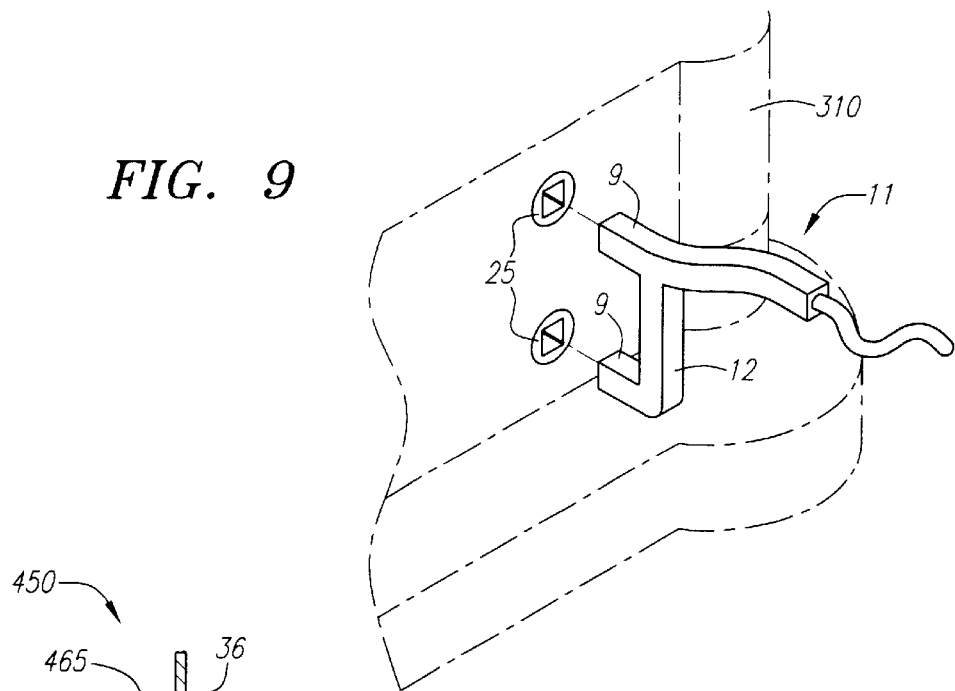
FIG. 9 is a diagram of an exemplary receiving unit arrangement integrated into the tailgate of a pickup truck in accordance with the present invention.

Turning to FIG. 9, in accordance with the present invention, the receiving unit is implemented as a plurality of receiving apertures 25 used as engaging structures, integrated into the tailgate 310, as described above, stacked vertically, and spaced at a set distance. The immobilizing systems described above may also be integrated into the tailgate 310. A carrier bar 11 includes a receptacle element 9 for each receiving aperture 25 and is joined together via a vertical bar 12. The carrier bar 11 may be inserted into the receiving apertures 25 and locked into place. This receiving unit may also be integrated into a rear door, a rear license plate wall, and a trunk lid. This receiving unit distributes the load over a large area and requires less depth in the receiving apertures 25.

Figure 10:
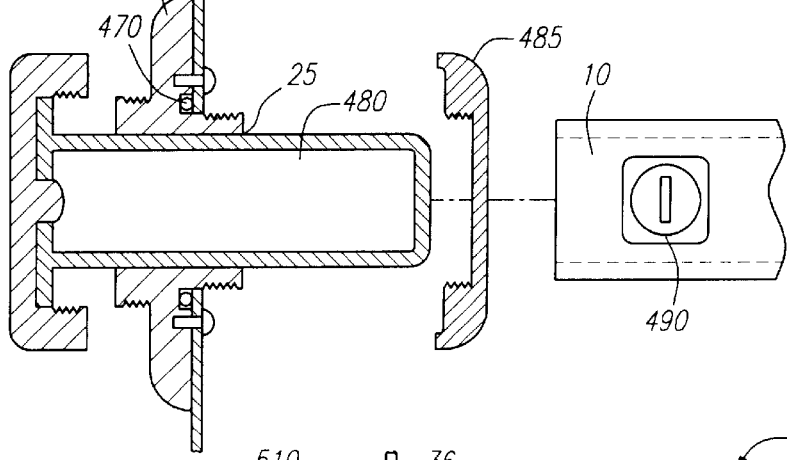
FIG. 10 is a plan view of another exemplary receiving unit in accordance with the present invention.

Turning to FIG. 10, another receiving unit 450 is shown in accordance with the present invention. The receiving unit 450 is integrated onto the rear wall of a vehicle 36. The receiving unit 450 includes a hole 25 created in the rear wall 36 and a hollow load spreading element 465 welded and/or mounted to the inside of the rear wall 36, surrounding the hole 25 such that the load spreading element 465 slightly protrudes from the rear wall 36 via the hole 25. The inside of the rear wall 36 that is adjacent to the hole 25 includes a water and/or dust gasket 470. The engaging structure of the receiving unit 450 includes a male carrier support 480, having rear and forward ends, that is slid through the load spreading element 465 via the hole 25 with the rear end protruding from the rear wall 36 and is secured from inside of the rear wall 36 by tightening a locking nut attached to the forward end of the male carrier support 480. A carrier bar 10 with a diameter just larger than the male carrier support 480 may be snugly fitted over the carrier support 480. The carrier bar 10 also includes a locking mechanism 490. When the unit 450 is not in use, the male carrier support 480 may be covered by a removable cover plate 485.

Figure 11:
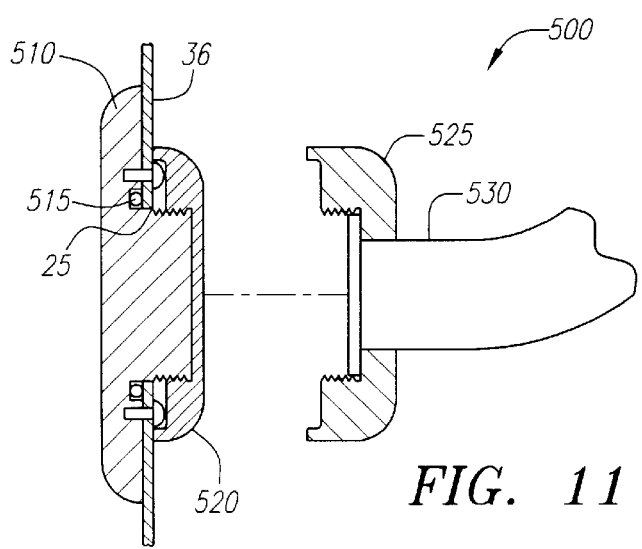
FIG. 11 is a plan view of an alternative receiving unit in accordance with the present invention.

Turning to FIG. 11, another receiving unit 500 in accordance with the present invention is shown. The unit 500 includes a receiving hole 25 formed in the rear wall of a vehicle 36. A load spreading element 510, having an engaging structure, is welded and/or mounted to the inside of the wall 460 such that the engaging structure slightly protrudes out of the wall 460 through the receiving hole 25. A water and/or dust gasket is placed in between the element 510 and the wall 460, proximate to the receiving hole 25. A carrier bar 530 having an end covered with a locking nut 525 is attached to the structure 460. The locking nut 525 may be hand tightened onto the structure 460 to secure the carrier bar 530 in place. While the unit 500 is not in use, the carrier bar 530 may be removed and replaced with a removable cover plate 520 that may be placed over the engaging structure.

Figure 12:
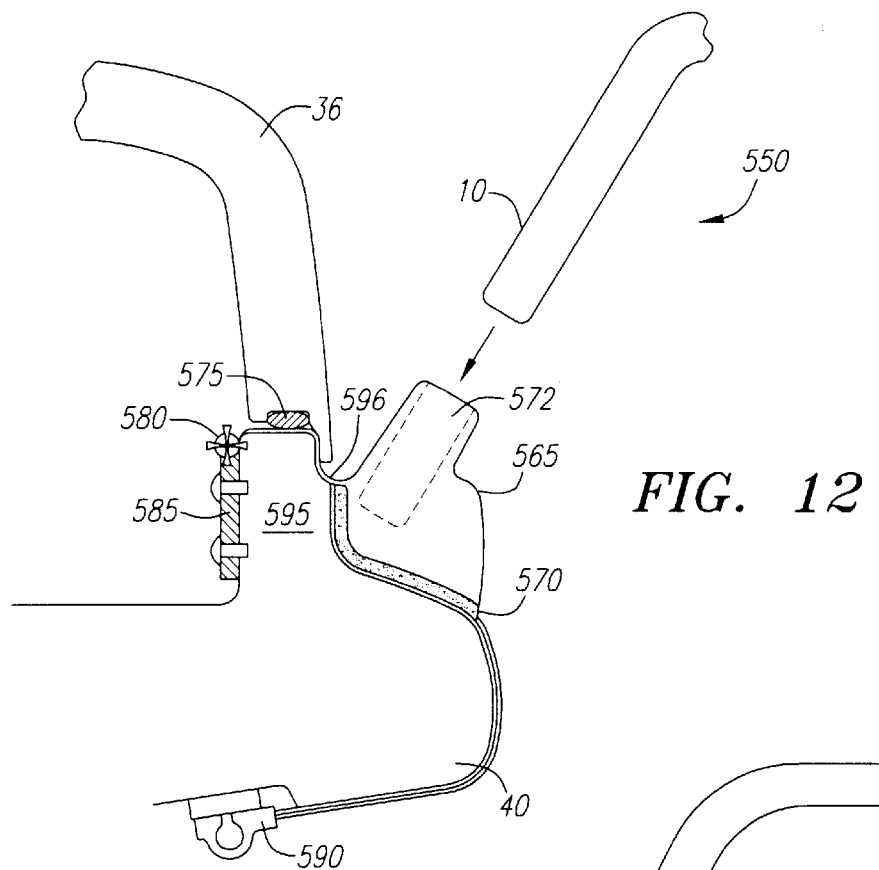
FIG. 12 is a side view of an exemplary carrier system in accordance with the present invention.

Turning to FIG. 12, a carrier system 550 in accordance with the present invention is shown, integrated into a rear wall of a vehicle 595, in between a trunk lid 35 and a bumper 40. The receiving unit includes a mounting plate 585 that may be mounted via bolts and/or screws to the inside of the rear wall 595. On top of the mounting plate 585, a hinge 580 is attached. Connected to the hinge 580 is a thin plate 596 that conforms to the shape of the surface between the rear wall 595 and the trunk lid 35. While in use, the thin plate 596 rests on top of the surface, and the thickness of the plate 596 is minimal to allow the trunk lid to close. A rubber coating 575 is attached on top of the plate 596, to protect the thin plate 596 from the trunk lid 35 when the trunk lid 35 is shut.

A receptacle 565, having a bottom that conforms to the shape of the upper section of the bumper 40 and rear and forward ends, rests on top of the bumper. The forward end is attached to the thin plate 596 at a section that protrudes from the area above the rear wall 595. The bottom of the receptacle 565 is insulated with rubber 570 to protect the bumper, and the top of the receptacle 565 includes a receiving aperture 572, which forms the engaging structure of the receiving unit. A carrier bar 10 may be inserted into the receiving aperture 572. A strap is connected to the rear end of the receptacle 565 and is strapped around the bumper 40 and tied to a portion of the bottom 590 of the structure of the vehicle, such as a hook or a loop. When the system is no longer in use, the carrier bar 10 may be removed, the strap may be unhooked, and the receiving unit may be pivoted back into the trunk space via the hinge 580.

Figure 13:
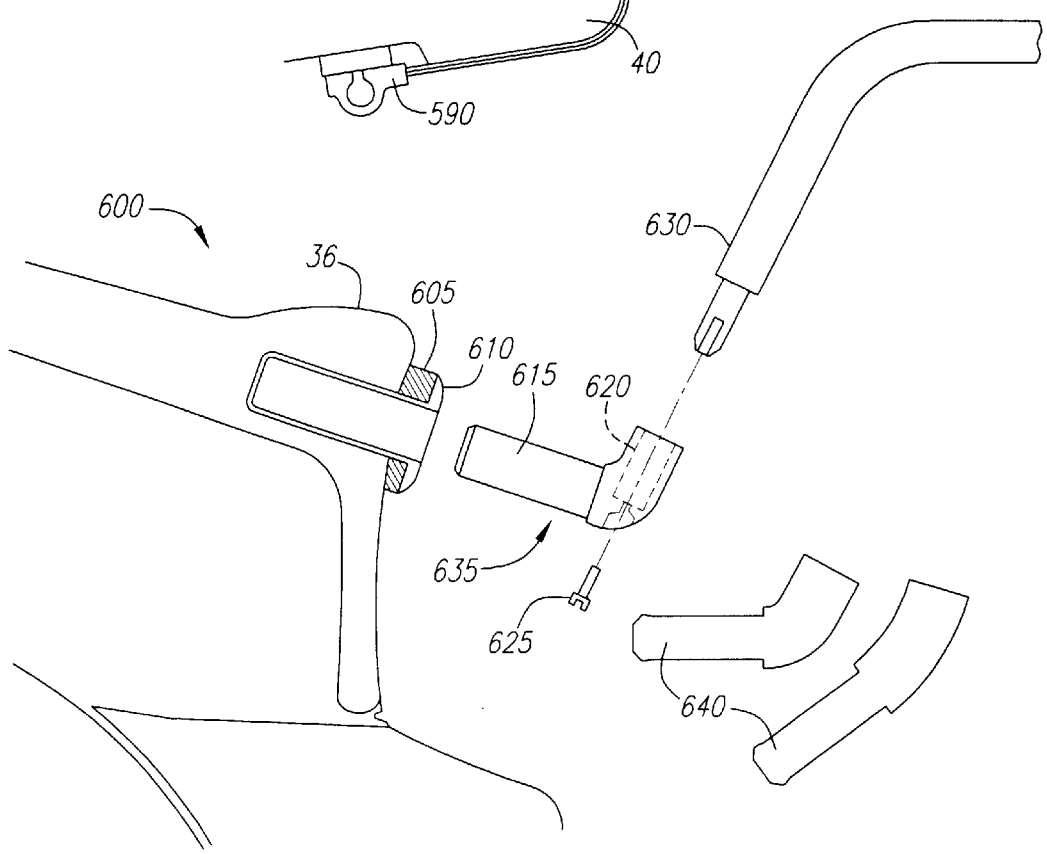
FIG. 13 is a side view of another exemplary carrier system in accordance with the present invention.

Turning to FIG. 13, another exemplary carrier system 600 is shown integrated into a rear wall of a vehicle 36. A hollow receptacle 610, having an opening, is integrated into the rear wall 36, which may involve drilling a hole into the rear wall 36. The receptacle 610 is inserted into the rear wall 35 with the opening exposed. Rubber stoppers 605 are used to protect the rear wall 36 from any scratches and also to immobilize the receptacle 610. An adapter 635, having an engaging portion 615 attached to a carrier bar connector 620, is attached to the receptacle 610. Specifically, the engaging portion 615 of the adapter 635 may be inserted into the opening of the receptacle 610 and held in place. The carrier bar connector 620 is attached to the carrier bar 630 via a screw 625—the carrier bar 630 having an end adapted to receive a screw 625. A selection of adapters 640 may be used to accommodate a range of angles that may be required due to varying shapes of the vehicles and/or varying shapes of the carried items.

Figure 14:
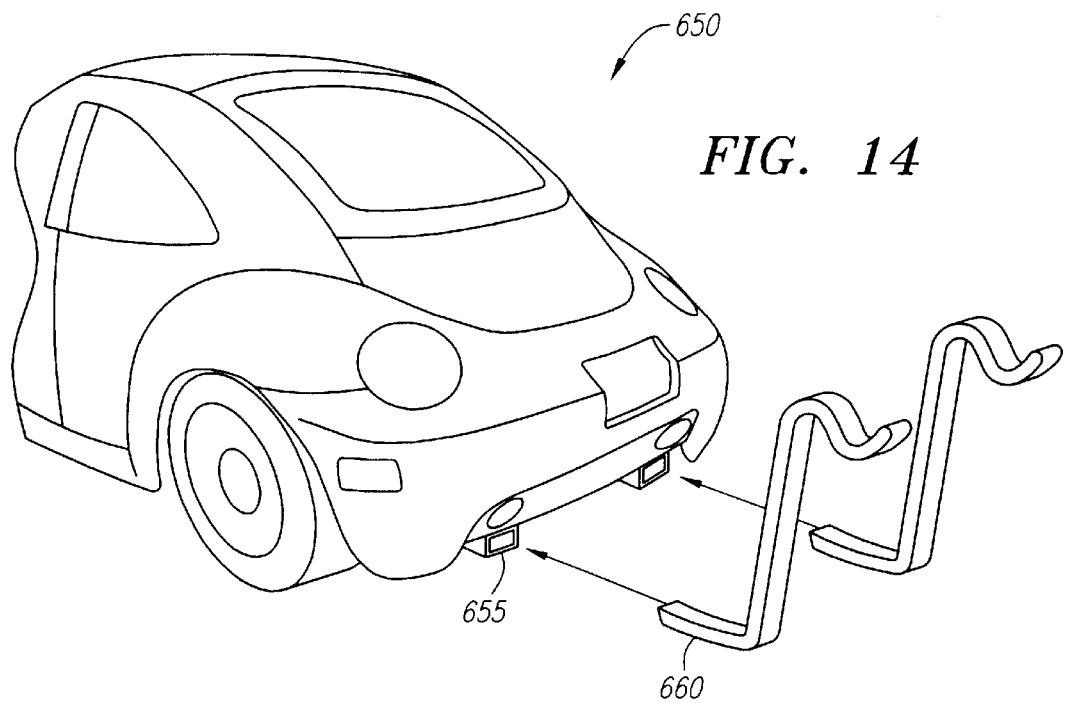
FIG. 14 is a diagram of an alternative exemplary carrier system in accordance with the present invention.

Turning to FIG. 14, another exemplary embodiment of the present invention is shown. A carrier system 650 in accordance with the present invention is integrated to a vehicle having a horizontal element on the underside of a rear bumper. One or more hollow receptacles 655 having forward and rear ends is integrated to the horizontal element, which may involve welding and/or mounting the receptacles to the horizontal element. The receptacles 655 are positioned longitudinally such that the forward end is directed toward the front of the vehicle and the rear end is directed toward the back of the vehicle. L-shaped carrier bars 660 may be inserted into the receptacles 660. These receptacles 655 do not require alteration of the body and can more easily accommodate structural integration with the vehicle. In FIG. 14, a pair of receptacles 655 are integrated to the horizontal element on the underside of the rear bumper. The carrier bars 660 are two separate pieces, each inserting into the receptacles 655. The carrier bar may be one piece with two engaging L-shaped bars interconnected with a lateral bar.

Figure 15:
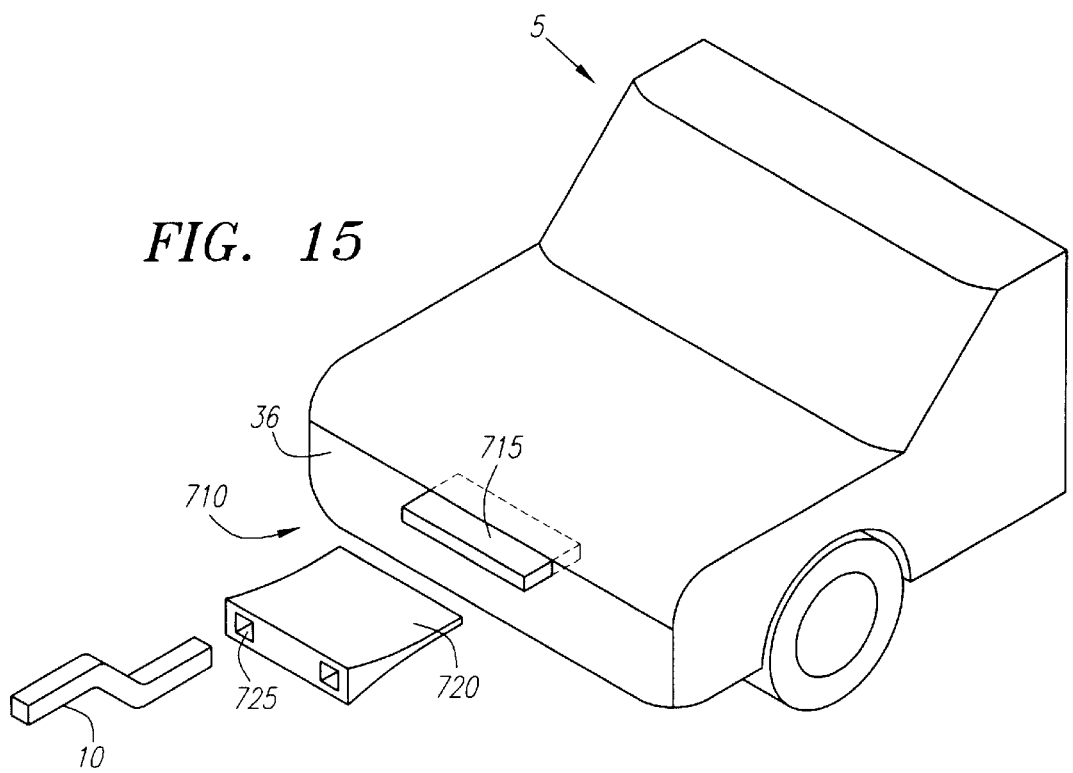
FIG. 15 is a diagram of an alternative exemplary carrier system in accordance with the present invention.

Turning to FIG. 15, an alternative exemplary carrier system 710 integrated into the rear wall 36 of a vehicle 5 in accordance with the present invention is shown. The receiving unit 715 is integrated into the rear wall 36 and includes a thin hole created laterally in the rear wall 36 and a hollow and thin receptacle holder 715 is fitted into the hole, creating the engaging structure. The receptacle holder 715 may be supported with a support system described above. A thin receptacle 720, having rear and forward ends, may be inserted into the receptacle holder 715. The forward end is thin enough to fit inside the receptacle holder, and the rear end is thicker and includes a pair of receiving holes 725 located side-by-side in the rear end. Carrier bars 10 may be inserted into the receiving holes. This system 710 is more unobtrusive when the system 710 is not in use because only a thin hole is made in the rear wall 36.

Figure 16:
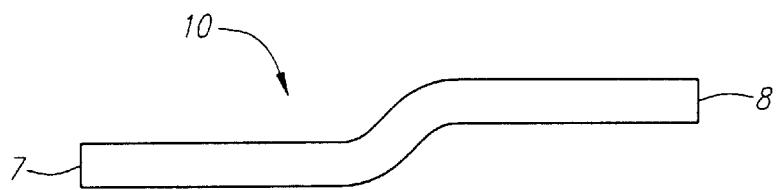
FIG. 16 is a diagram of an exemplary carrier bar in accordance with the present invention.
Figure 17:
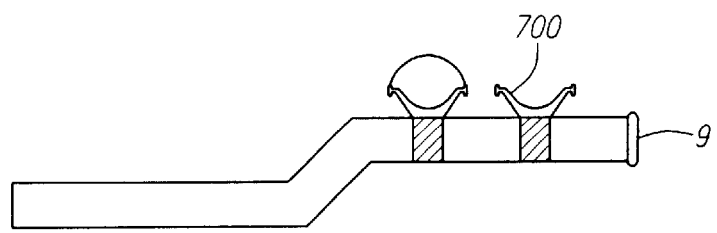
FIG. 17 is a diagram of an exemplary carrier bar with attachments in accordance with the present invention.

Alternative embodiments of the carrier bar in accordance with the present invention will now be described. Turning to FIG. 16, a carrier bar 10 generally has a rear 7 and forward 8 end and may include a curvature in the middle. The forward end 8 generally attaches to a receiving unit and the rear end 7 generally comes in contact either directly or indirectly with the carried item. The carrier bars may vary in length and diameter, depending on the strength of the material used. The carrier bar may be composed of metal and/or plastic. In the preferred embodiment, the carrier bar 10 is made of metal. Turning to FIG. 17, the carrier bars may be universal—able to accept many different attachments 700 and able to attach to any vehicle having a receiving unit—or function specific—different shape for different functions. The carrier bar 10 may be comprised of one piece, but also may be jointed in the middle of the bar, or, as described above, may be telescopic. The carrier bar 10 may also include a breaking point to more easily collapse if the carrier bar is involved in a sudden impact. The cross-sectional shapes may vary. For example, shapes may be square, rectangular, triangular, circular, I-beam, and/or oval. The cross-sectional shape may be changed by slipping another shape over the basic shape.

The carrier bar 10 may be straight or curved, meaning it may include a curvature in between the forward and rear end of the carrier bar as shown in FIG. 16, and may include a rubber gasket between the carrier bar and an attachment to function as a shock absorber and decrease vibration. The rear end 8 may include longitudinal teeth and/or grooves along the length of the bar. These grooves and/or teeth may be slightly curved such that the bar would require rotation during attachment to the receiving unit. The rear end 8 may also be capped with a red reflector or red light 9 to notify the vehicles behind for safety. The carrier bar 10 may be hollow or solid, and may attach to the receiving unit by a screw mechanism, latch mechanism, and/or a locking mechanism located on the inside and/or outside of the receiving unit and/or vehicle. The carrier bar may be telescopically attached to the receiving unit, or the carrier bar may be telescopically integrated into the receiving unit, meaning the carrier bar may be telescopically pulled out from within the receiving unit.

Depending on the height of the receiving unit relative to the ground, the carrier bar 10 may be curved such that that rear end is high enough to keep the bottom portion of the carried item a minimal distance off the ground. In the case of a bicycle as a carried item positioned horizontally, it is preferred to have the bottom portion of the wheel at least one foot above the ground. If the height of the bicycle, measured from the bottom of the wheel is 2.5 feet, then the carrier bar needs to be about 3.5 feet above the ground.

Figure 18:
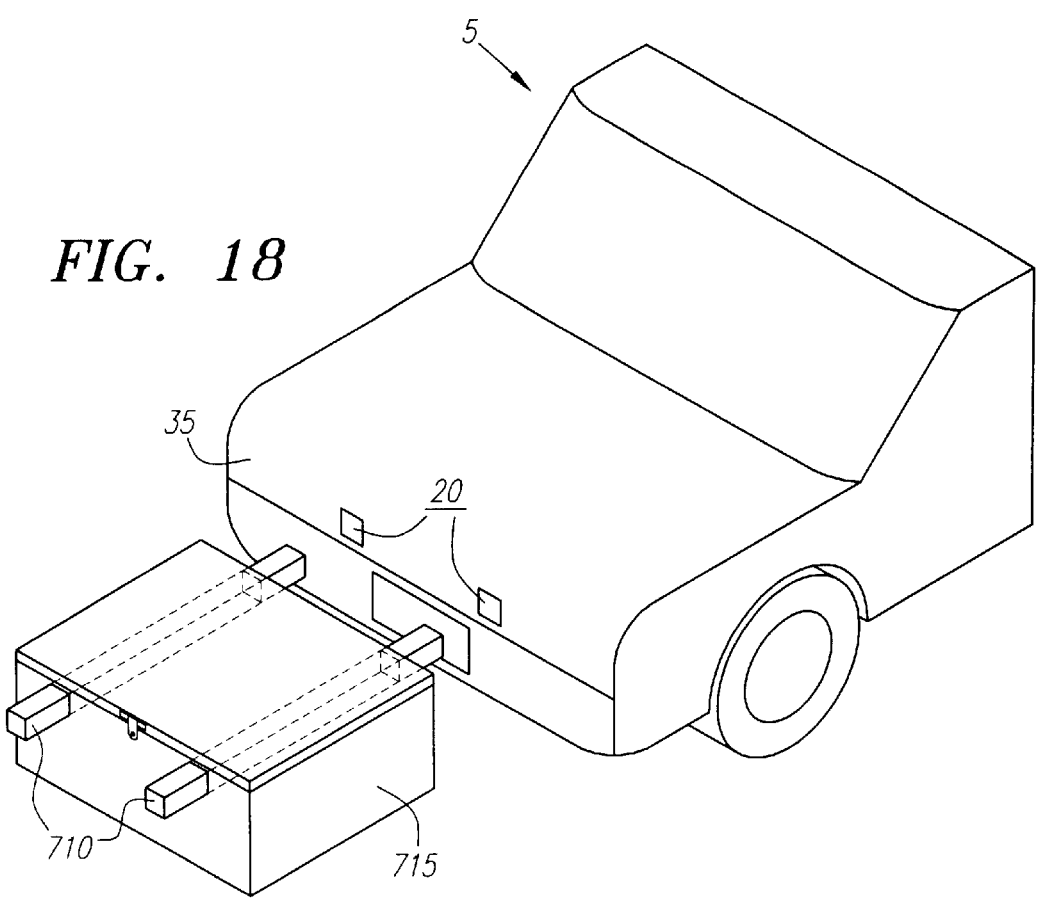
FIG. 18 is a diagram of exemplary carrier bars designed to carry general storage units in accordance with the present invention.

Turning to FIG. 18, a carrier bar designed to carry general storage units in accordance with the present invention is shown. A pair of straight carrier bars 710, having forward and rear ends, the forward ends are inserted into a pair of receiving units 20 that are described above and shown in FIG. 1, and may be attached to other receiving units described above. A general storage unit 715 may contain a variety of items including luggage, sports equipment, ice chests, and/or other miscellaneous items. The general storage unit 715, having forward and rear ends, includes a pair of holes at each end that are positioned side-by-side, at a distance approximately equal to the distance between the receiving units 20. Each hole on the forward end is aligned with a hole on the rear end. The carrier bars are 710 are inserted through the holes such that each carrier bar protrudes out the forward end and the rear end. The general storage unit 715 is a size such that the bottom of the storage unit 715 does not reach the ground, and may be simultaneously used with other units, such as a ski carrying unit.

Figure 19:
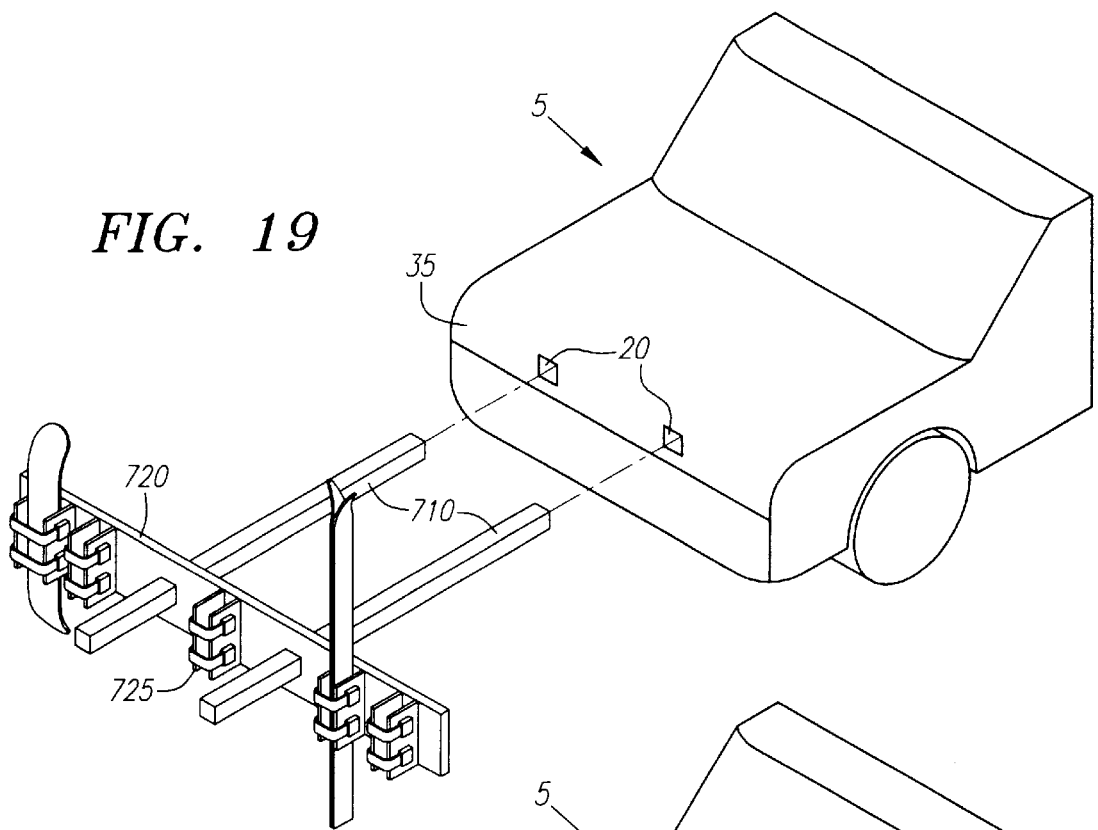
FIG. 19 is a diagram of exemplary carrier bars designed to carry items such as skis, snowboards, and wake boards, in accordance with the present invention.

Turning to FIG. 19, a carrier bar designed to carry items such as skis, snowboards, wake boards, in accordance with the present invention, is shown. A pair of straight carrier bars 710, having forward and rear ends, the forward ends are inserted into a pair of receiving units 20 that are described above and shown in FIG. 1, and may be attached to other receiving units described above. A long and rectangular shaped board 720, having forward and rear ends and a pair of holes, positioned along the length of the board and spaced at a distance approximately equal to the distance between the receiving units 20, is attached to the carrier bars such that the carrier bars are inserted through the holes and the board 720 is situated laterally. The forward end is facing the front of the vehicle, and the rear end is facing the back of the vehicle. A number of attachments capable of holding items such as snowboards, skis, and wake boards in place, are mounted to the board 720 and placed side-by-side such that the items attached are held in vertical position. The attachments may include clips into which the item may be easily inserted and locked into place. The attachments may also include key locks to prevent theft.

Figure 20:
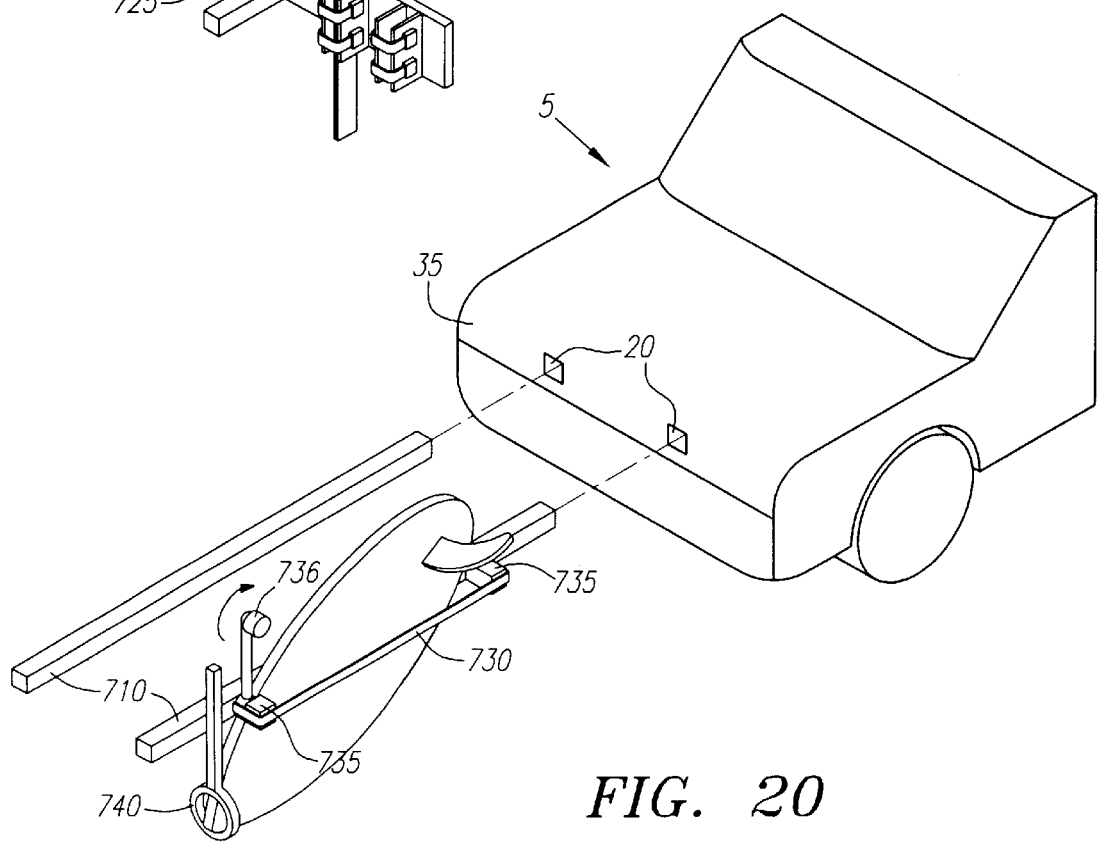
FIG. 20 is a diagram of exemplary carrier bars designed to carry surfboards in accordance with the present invention.

Turning to FIG. 20, a carrier bar designed to carry items such as surfboards, in accordance with the present invention is shown. A pair of straight carrier bars 710, having forward and rear ends, are inserted into a pair of receiving units 20 that are described above and shown in FIG. 1, via the forward ends, and may be attached to other receiving units described above. A pair of add-ons 735 may be attached along a side of the carrier bar 710 and spaced at a predetermined distance—this distance may be adjustable. A rubber and/or adjustable strap, having forward and rear ends, is attached to the add-ons 735 such that the forward end is attached to the add-on located toward the forward end of the carrier bar 710 and the rear end is attached to the add-on located toward the rear end of the carrier bar 710. A surfboard may be placed between the two add-ons and held in place by tightening the strap or ensuring that the strap is taut around the surfboard. Alternatively, the add-on toward the rear end of the carrier bar may include a member having a set length and bottom and top ends, such that the bottom end is attached, for example, via a screw, to the carrier bar and is capable of swiveling on an axis formed by the attachment of the bottom end and the carrier bar, and the top end may pivot until it touches the side of the surfboard 736. The strap 730 that comes across the surfboard is attached to the top end of the member 736, such that when the strap 730 comes across the surfboard, the strap 730 is positioned perpendicular to the length of the surfboard. The bottom end may include a receptacle in which the member 736 may pass through so that the length of the member 736 that extends above the carrier bar 735 may be adjustable.

An adjustable bottom holder 740 is also attached to the side of the carrier bar 740 to hold the bottom of the surfboard in place, immobilizing the surfboard and preventing it from touching the ground. In FIG. 1, the bottom holder 740 is placed toward the rear end of the carrier bar. The bottom holder may be adjusted according to the height of the surfboard. It includes an oval shaped member located at the bottom end of the holder and may be lined with a protective padding to protect the surfboard.

Concepts of the invention as described above can be integrated into the front of a vehicle, such as the front grill of a truck, bus, motor home, van, minivan, or SUC. And, the concepts of the invention as described above can also be integrated into the side of a vehicle, such as a side of a truck bed, a side door, or a side of a trunk lid.

While embodiments of the present invention have been shown and described, various modifications may be made without departing from the spirit and scope of the present invention, and all such modifications and equivalents are intended to be covered.

What is claimed is:

1. A carrier rack system for a motor vehicle having a front and back, a rear bumper, and a rear wall having an inside and outside, located above the bumper, comprising:
   a receiving unit, having rear and forward ends, integrated into the rear wall, wherein the forward end of the receiving unit is positioned toward the front of the vehicle and the rear end of the receiving unit is positioned toward the back of the vehicle, and wherein the rear end of the receiving unit forms an engaging structure in the rear wall;
   an immobilizing system integrated into the rear wall and attached to the receiving unit; and
   a carrier bar adapted to be engaged to the engaging structure, wherein the carrier bar protrudes from the outside of the rear wall.

2. The carrier rack system in claim 1, wherein the rear wall comprises at least one of: a trunk lid, a rear license plate wall, a rear wall located underneath a trunk lid and above a bumper, a rear door, or a tailgate.

3. The carrier rack system in claim 1, wherein the immobilizing system comprises:
   a supporting bar positioned horizontally in the rear wall.

4. The carrier rack system in claim 1, wherein the immobilizing system comprises:
   a supporting bar positioned vertically in the rear wall.

5. The carrier rack system in claim 1, wherein the immobilizing system comprises:
   a supporting bar extending vertically and integrated into the chassis.

6. The carrier rack system in claim 1, wherein the immobilizing system comprises:
   a supporting bar positioned longitudinally along the inside of the rear wall.

7. The carrier rack system in claim 1, wherein the immobilizing system comprises:
   a supporting bar positioned in an angle in the rear wall.

8. The carrier rack system in claim 1, wherein the immobilizing system comprises:
   a plurality of supporting bars attached to the receiving unit.

9. The carrier rack system in claim 1, wherein the engaging structure comprises an aperture located in the rear wall, and wherein the carrier bar is detachable and, when engaged, inserted into the aperture.

10. The carrier rack system in claim 1, wherein the receiving unit further comprises a cover plate that covers the engaging structure when the receiving unit is not in use.

11. The carrier system of claim 1, wherein the carrier bar is detachable and is fitted over the engaging structure.

12. The carrier system of claim 1, wherein the carrier bar is telescopically attached to the engaging structure.

13. The carrier system of claim 1, wherein the carrier bar is telescopically integrated into engaging structure.

14. The carrier system of claim 1, wherein the carrier bar includes a breaking point.

15. The carrier system of claim 1, wherein the carrier bar has a forward end and a rear end and the carrier bar is curved in between the forward end and the rear end.

16. The carrier system of claim 1, wherein the receiving unit comprises:
   an aperture, located in the rear wall;
   a load spreading element with a hole slightly smaller than the aperture, mounted to the inside of the rear wall, wherein the hole is centered around the aperture; and
   a receiving bar forming the engaging structure, protruding through the hole and secured by the load spreading element.

17. A carrier rack system for a motor vehicle having a front and back, inside and outside, and a side wall having an inside and outside, comprising:
   a receiving unit, having rear and forward ends, integrated into the side wall, wherein the forward end of the receiving unit is positioned toward the inside of the vehicle and the rear end of the receiving unit is positioned toward the outside of the vehicle, and wherein the rear end of the receiving unit forms an engaging structure in the side wall;
   an immobilizing system integrated into the side wall and attached to the receiving unit; and
   a carrier bar engaged to the engaging structure, wherein the carrier bar protrudes from the outside of the side wall.

18. A carrier rack system for a motor vehicle having a front and back, a rear bumper, and a rear wall, having an inside and outside, located above the bumper, comprising:
   a plurality of receiving units, each having rear and forward ends, integrated into the rear wall, arranged horizontally, and spaced at a set distance, wherein the forward end of each receiving unit is positioned toward the front of the vehicle and the rear end of each receiving unit is positioned toward the back of the vehicle, and wherein the rear end of each receiving unit forms a receiving aperture in the rear wall;
   an immobilizing system integrated into the rear wall and attached to each receiving unit; and
   a plurality of carrier bars, each inserted into each receiving aperture, wherein the carrier bars protrude from the rear wall when attached.

19. The carrier rack system in claim 18, wherein the rear wall is a trunk lid and the receiving units are hollow bars mounted longitudinally along the inside of the trunk lid, and further wherein the immobilizing system comprises of a support bar mounted laterally to the trunk lid and attached to the hollow bars.

20. A carrier rack system for a motor vehicle having a rear wall with an inside and outside comprising:
   an aperture located in the rear wall;
   a structure having a channel mounted to the outside of the rear wall, surrounding the aperture and positioned such that the channel is aligned with the aperture;
   a receptacle guide, having a channel and a first and second side, placed between two parallel thin plates, wherein each side of the receptacle guide is attached to a thin plate such that the receptacle guide is capable of pivoting on an axis perpendicular to the thin plates, and wherein the thin plates are mounted to the inside of the rear wall, positioned perpendicular to the rear wall, surrounding the aperture;
   a receptacle, having rear and forward ends, inserted into the receptacle guide such that the receptacle is capable of sliding along the channel of the receptacle guide;
   wherein the receptacle may be pivoted along the axis until the rear end of the receptacle is aligned with the aperture in the rear wall and wherein the receptacle may be slid through the hole in the rear wall and through the channel of the structure until the rear end of the receptacle protrudes from the structure;
   a carrier bar attached to the rear end of the receptacle.

21. The carrier rack system in claim 20, wherein the receptacle is hollow and the carrier bar is inserted into the receptacle.

22. The carrier rack system in claim 20, wherein the carrier bar is telescopically integrated into the receptacle.

* * * * *